United States Patent Office 3,531,364
Patented Sept. 29, 1970

3,531,364
COATING COMPOSITION, LAMINATE AND
METHOD FOR MAKING LAMINATE
Claude J. Schmidle, Hudson, and Donald Van Wagenen, Alliance, Ohio, assignors to The General Tire & Rubber Company, a corporation of Ohio
No Drawing. Filed Jan. 23, 1967, Ser. No. 610,795
Int. Cl. B32b 27/40; C08d 13/16; C08g 41/04
U.S. Cl. 161—88                                    9 Claims

ABSTRACT OF THE DISCLOSURE

An isocyanate containing polyesterurethane is reacted with a low molecular weight terpolymer of acrylate, alkacrylate and hydroxy containing acrylate and/or alkacrylate monomers of an inherent viscosity of 0.3 to 0.75 and an OH number of from 30 to 90 to make a product which is flexible, resistant to scratching and resistant to dry cleaning solvents (tack free or essentially tack free). The product is useful in forming laminates which have excellent hand and slip and which may be used in the manufacture of clothing such as windbreakers, raincoats and so forth.

---

An object of the present invention is to provide a composition which is scratch resistant and resistant to dry cleaning solvents.

Another object is to provide a laminate comprising a composition coating adherent to a substrate, said laminate being flexible, having excellent hand and slip, being scratch resistant and being resistant to dry cleaning solvents.

Still another object is to provide a process for making a laminate comprising depositing on a flexible laminate a thin coating solution of polymers which on heating to remove solvent and curing forms a reaction product which is flexible, has excellent hand and slip, is scratch resistant and is resistant to dry cleaning solvents.

These and other objects and advantages of the present invention will become more apparent to those skilled in the art from the following detailed description and examples.

According to the present invention, it has been discovered that flexible films or laminates suitable for clothing can be prepared by coating a flexible substrate with a thin, adherent and flexible coating composition of the reaction product of a particular isocyanate containing polyesterurethane and a particular hydroxy containing acrylate terpolymer. The reaction product as a thin film itself or as a coating on a flexible substrate has excellent hand and slip, is resistant to scratching and is resistant to dry cleaning solvents.

THE POLYESTERURETHANE

The polyesterurethane is obtained by the reaction of an aliphatic diisocyanate having from 4 to 14 carbon atoms between the isocyanato groups and a polyester diol having an average molecular weight of from about 1000 to 4000.

Examples of diisocyanates to use are 1,3-butylene diisocyanate, tetramethylene diisocyanate, amylene diisocyanate, 1,3-isobutylene diisocyanate, hexamethylene diisocyanate, heptamethylene diisocyanate, 1,5-heptylene diisocyanate, octamethylene diisocyanate, decamethylene diisocyanate, 1,4-cyclohexene dissocyanate, 1,4-cycloheptene diisocyanate, dodecamethylene diisocyanate, 1,3-cyclopentene diisocyanate, 4,4'-methylene bis(cyclohexyl isocyanate), p-methane diisocyanate, tetra decamethylene diisocyanate, 3,3'-diisocyanato dipropylether, and the like and mixtures thereof. The aliphatic diisocyanates, which include the cycloaliphatic diisocyanates, of this invention provide coatings with good gloss retention and good color stability.

The polyester diol used with the diisocyanate to make the polyurethane should have an average molecular weight of from about 1000 to 4000, preferably of from about 2000 to 3000. It is prepared by the reaction of a saturated aliphatic dicarboxylic acid having from 4 to 10 carbon atoms and a saturated aliphatic diol or glycol having from 2 to 6 carbon atoms. Sufficient or excess diol is employed to provide a polyester diol. The esterification reaction is conducted so that the desired molecular weight is obtained and the carboxyl number is not over about 1.5 and preferably not over about 0.1–0.2.

Examples of suitable acids to use in making the polyesters are adipic acid, succinic acid, glutaric acid, β-methyl adipic acid, pimelic acid, suberic acid, azelaic acid, sebacic acid, and the like and mixtures thereof. Useful diols to make the polyesters are ethylene glycol, diethylene glycol, triethylene glycol, 1,2-propylene glycol, 1,3-propylene glycol, 1,4-butane diol, 2-methyl-1,2-propane diol, 1,6-hexane diol, 2,6-hexane diol, 1,4-pentane diol, neopentyl glycol, dipropylene glycol and the like and mixtures thereof. It is preferred that the polyesters be of the non-crystalline type to get better luster in and to avoid crazing of the resulting coating when elongated. Moreover, the non-crystalline polyesters afford highly abrasion resistant and solvent resistant coatings. Examples of non-crystalline type polyesters are 60/40 ethylene glycol/1,4-butylene glycol-adipates and diethylene glycol-adipates. Crystallinity can be reduced or avoided by using mixtures of acids and glycols to reduce or eliminate regularity in the polyester chain. However, crystalline type polyesters, for example butane diol-1,4/adipic acid polyesters, having a low average molecular weight, i.e. about 1,000 to 1,500, can be used in place of the non-crystalline type polyesters.

The diisocyanate and polyester diol are reacted together in a mol ratio of the diisocyanate to the polyester diol of from about 1.5:1 to 2:1 under an inert atmosphere, in an anhydrous or essentially anhydrous atmosphere, or otherwise under conditions free or essentially free of water or moisture to avoid the formation of $CO_2$ or foams and a consequent loss of available isocyanate groups. Heat is applied as necessary to make the reaction proceed expeditiously. The resulting polyesterurethane containing NCO groups, or prepolymer, is stored under an inert or dry atmosphere or in a dry solvent such as a ketone solvent (methyl isobutyl ketone).

The preparation of a polyesterurethane useful in making coatings according to this invention is as follows: An excess of a mixture of 60 mol percent ethylene glycol and 40 mol percent 1,4-butane diol is reacted with adipic acid in a resin kettle with removal of water during the reaction to give a polyester diol having an average molecular weight of about 2250 and an acid number of less than 1.5. The polyester diol in an amount of 33.3 mol percent is then reacted with 66.7 mol percent of hexamethylene diisocyanate in a reactor under essentially anhydrous conditions for 1 hour at 90° C. to give a viscous polyesterurethane prepolymer having 3.5% free isocyanate. The prepolymer is stored under anhydrous conditions until used. However, the prepolymer, also, can be dissolved in sufficient suitable dry volatile organic ester, or solvent, under anhydrous conditions to provide a solution (85% solids by weight). Ketone and/or ester solvents are preferred. Some aromatics can be used with the ketones or esters. Additional anhydrous or essentially anhydrous low-boiling or volatile solvents like ketones and esters containing some aromatics like benzene, toluene, etc. can be added to the prepolymer solution to reduce its viscosity if desired and to improve flow and leveling of the coating.

THE TERPOLYMER

The terpolymer is prepared by addition copolymerization of from about 7.5 to 18 mol percent (preferably from about 10 to 15 mol percent of a hydroxy containing alkyl acrylate and/or alkyl alkacrylate, from about 30 to 45 mol percent of an alkyl acrylate, and from about 40 to 55 mol percent of an alkyl alkacrylate, the total amount of these monomers used being equal to 100 mol percent.

The use of less than about 7.5 mol percent of the hydroxy containing acrylates and alkacrylates in the terpolymer reduces the abrasion resistance of the resulting coating and the compatibility of the terpolymer with the polyurethane prepolymer while the use of more than about 18 mol percent of this monomer also reduces abrasion resistance and increases the cost of the resulting coating or composition. Moreover, using more alkyl acrylate monomer or alkyl alkacrylate monomer than shown above reduces the hydrolysis resistance of the resulting coating composition.

The hydroxy containing alkyl acrylate or alkacrylate monomer has the formula

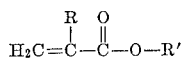

where R is hydrogen or a methyl or an ethyl radical and where R' has the formula

in which $R_a$ is an alkylene group of 2 to 3 carbon atoms, in which $R_b$ is an alkylene group of 2 to 4 carbon atoms and in which $x$ is 0 or 1. Examples of monomers of this type are beta hydroxy ethyl acrylate, beta hydroxy ethyl methacrylate, beta hydroxy ethyl ethacrylate, beta hydroxy propyl acrylate, gamma hydroxy propyl acrylate, beta hydroxy propyl methacrylate, beta hydroxy butyl methacrylate, beta hydroxy butyl acrylate, gamma hydroxy butyl ethacrylate, 4-hydroxy butyl acrylate and the like. Further examples of hydroxy containing acrylates to use are the monoesters of dipropylene glycol and/or diethylene glycol with acrylic acid, methacrylic acid and/or ethacrylic acid. Still other examples of hydroxy containing acrylates are the reaction products of ethylene oxide and/or propylene oxide with acrylic acid, methacrylic acid and/or ethacrylic acid. Mixtures of these hydroxy containing acrylate monomers can be employed in the practice of this invention.

The alkyl acrylate monomer has the formula

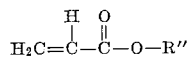

where R'' is an alkyl group of from 1 to 4 carbon atoms such as a methyl, ethyl, propyl, butyl, isobutyl radical and the like. Examples of such monomers are methyl acrylate, ethyl acrylate, propyl acrylate, butyl acrylate, isobutyl acrylate and so forth. Mixtures of these monomers can be used.

The alkyl alkacrylate monomer has the formula

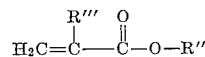

where R'' is an alkyl radical of from 1 to 4 carbon atoms such as methyl, ethyl, propyl, isopropyl, butyl, isobutyl and the like and where R''' is a methyl or an ethyl radical. Examples of monomers of this type are methyl methacrylate, ethyl methacrylate, isopropyl methacrylate, butyl methacrylate, methyl ethacrylate, ethyl ethacrylate, propyl ethacrylate, isobutyl ethacrylate and the like. Mixtures of these monomers can be employed.

In the above monomers the R' and R'' groups do not exceed 4 carbon atoms to maintain resistance to dry cleaning solvents. Also, the R and R''' groups do not exceed 2 carbon atoms to avoid problems of steric hindrance during polymerization. A very useful terpolymer is one composed of methyl methacrylate, methyl acrylate and beta hydroxy ethyl methacrylate in the mol ratios shown above.

The monomers are copolymerized in solvent to form a terpolymer having an inherent viscosity (0.3% in tetrahydrofuran, or 0.3 g. polymer in 100 g. THF) of from about 0.3 to 0.75, preferably from about 0.4 to 0.5. The terpolymer, also, has a hydroxyl number of from about 30 to 90, preferably from about 50 to 55. This terpolymer gives the resulting composition good slip and hand with retention of flexibility. Also, this terpolymer provides the composition with resistance to dry cleaning solvents and yet is ironable.

The polymerization is conducted under an inert atmosphere (i.e. under a nitrogen, argon, neon, krypton, etc. atmosphere, in an atmosphere of the solvent used, or in one free of oxygen or other deleterious chemical) and in a dry, or essentially dry, high boiling point solvent such as a high boiling ketone (for example, methyl isobutyl ketone) at a preferred temperature of from about 50 to 90° C. to a minimum conversion of at least 92% (i.e., about 14–24 hours). Other solvents can be used such as esters (ethyl acetate) or aromatics (benzene or toluene), although it is preferred to use a ketone and/or an ester solvent which may on occasion be diluted with the aromatic solvent.

While conversions to 100% may be obtained, it is not desired to go much beyond 92–95% because of the increase in time involved and possible change in color and viscosity of the resulting terpolymer.

However, lower polymerization temperatures and even subzero temperatures may be used with anhydrous solvents liquid at −15 to 50° C. and with catalysts which are effective at such lower temperatures. Examples of such solvents are heptyl methyl ketone, dibutyl ketone, methyl propyl ketone, diethyl ketone and so forth. The use of such solvents which may be volatile and hazardous may require that the resulting terpolymer be stripped from the same and that the terpolymer be redissolved in higher boiling or less volatile solvents before formulation of the coating composition per se.

The viscosity and OH number of the terpolymer are controlled by the catalyst concentration and the polymerization temperature. Any free radical catalyst, azo or peroxygen type soluble in the monomer, can be used. Examples of useful catalysts are 2,2'-azobis (2-methyl propionitrile), benzoyl peroxide, lauroyl peroxide, acetyl peroxide, cumene hydroperoxide, paramenthane hydroperoxide, dimethyl azo diisobutyrate and so forth. The catalyst is used in an amount of from about 0.1 to 3.0 parts by weight, preferably from about 0.6 to 1.6 parts by weight, based on 100 total parts by weight of the monomers charged to the reactor.

A sufficient amount of solvent is used to dissolve the terpolymer and aid in controlling the heat of the reaction. The solvent is used in an amount of from about 100 to 325 parts by weight, preferably from about 190 to 300 parts by weight, based on 100 total parts by weight of the monomers charged to the reactor. More or less solvent can be used depending on the temperature control desired as discussed above and the desired fluidity of the resulting terpolymer solution. However, sufficient solvent should be used to dissolve the terpolymer. Bulk polymerization in large reactors is not desired due to difficulties in dissipating heat and controlling the reaction temperature as well as controlling the viscosity of the final terpolymer. An example of the method for polymerization is to charge to a nitrogen purged polymerization reactor the ketone solvent in the above amounts, the monomers in the amounts and ratios shown and the required amount of 2,2'-azo bis (2-methyl propionitrile) as a catalyst and copolymerize for 16–20 hours at 70° C. to a minimum conversion of 92%.

After polymerization, the polymerization solution (about 25–50% solids by weight) can be stripped of solvent and any unreacted monomers. However, in most cases it is uneconomical to separate the terpolymer from the solvent and free monomers, if any, since the terpolymer will then have to be redissolved in solvent for mixing with the polyurethane prepolymer or redissolved in the polyurethane prepolymer solution. In any event, the solvent and any monomers which have not further copolymerized or which do not copolymerize during the subsequent coating operation will be removed during casting or spreading, drying and curing of the coating composition. The composition containing the terpolymer dissolved in the high boiling point ketone solvent can be further diluted with more dry or essentially dry low boiling ketone or ester solvents which may contain some diluents such as toluene, benzene, etc. to get the desired fluidity or solids ratio.

THE COATING COMPOSITION

The coating composition is prepared by mixing together the polyurethane prepolymer and the acrylate terpolymer in an equivalence ratio of NCO-groups of the prepolymer to HO-groups of the terpolymer of from about 1:1 to 1:1.5. When a large excess of NCO groups are present in the coating composition, the desired level of tack freeness and slip are not obtained.

The polyurethane prepolymer is preferably dissolved in the terpolymer which is dissolved in the ketone polymerization solvent. However, as pointed out supra, the prepolymer may previously be dissolved in a ketone solvent and then both solutions are mixed together, preferably at the time of or just prior to coating or making a film. The composition can further be diluted with more dry organic solvent, such as ketones or esters which can contain some aromatic solvent as discussed above, which is added to the terpolymer solution, prepolymer solution or terpolymer-prepolymer combined solutions so that the final polymer solids in the coating composition is from about 15 to 25% by weight. Where appreciable amounts of other additives are used such as catalysts, wetting agents, light and color stabilizers, antidegradants, fungicides, pigments and so forth (for example, phthalocyanne blue, phthalocyanine green, carbon black, red iron oxide, organic phosphites, chlorinated organic phosphites, epoxy resin vinyl stabilizers (DER 332), silica, mixed metal soap vinyl stabilizers (Ferro 203), lecthin (Yelkins) are employed, it may be necessary to increase the solvent concentration to maintain the total solids ratio of from about 15 to 25% by weight in order to obtain a readily spreadable film or coating layer on a substrate of from about 0.1 to 0.4 mil in thickness after drying and curing.

While the acrylate terpolymer and the polyurethane prepolymer will cure or react together at room temperature, it is preferred and necessary for reasons of economy and practicality to use a polyurethane type catalyst. The use of a catalyst, also, avoids any slow attack on the NCO groups of the prepolymer by moisture in the air. Very suitable catalysts to use are the tetravelent tin catalysts, especially the dialkyl tin salts of carboxylic acids. An example of such catalyst is dibutyl tin dilaurate. Another useful catalyst is dibutyl tin disalicylate. Other tetravalent tin catalysts to use can be found in U.S. Pats. Nos. 3,084,177 and 3,194,773. The tin catalyst is used in an amount of from about 0.01 to 1.0 part by weight per 100 parts total weight of the prepolymer and terpolymer. The catalyst can be added to and mixed with either, or both, of the terpolymer and prepolymer before they or their solutions or mixed together, or it can be added to the mixture of the prepolymer and terpolymer in solvent before the resulting coating is applied. Besides tetravalent tin catalysts, other catalysts like lead naphthenate or zinc octoate which promote preferentially the NCO-glycol or urethane reaction can be employed.

Tertiary amine catalysts should not generally be used since during the coating or spreading operation the composition covers a large area and consequently its surface is exposed to a large volume of air. Under such circumstances the moisture or $H_2O$ in the air comes in contact with the coating, and the tertiary amine catalyzes the $H_2O$ and NCO reaction faster than the polyol and NCO reaction to form blisters, pores etc. in the coating. Of course, if the coating operation could be done under anhydrous conditions, some tertiary amine might be useful. Likewise, divalent tin polyurethane catalysts should be avoided as they have a tendency to hydrolyze in the solution giving a variable activity when the solution is used over a period of four hours or more.

Surfactants are desirably added to the coating composition before it is applied to or coated on a substrate such as a fabric of cotton, rayon, nylon, polyester or acrylic fibers or mixtures thereof or to polyvinyl chloride or polyvinyl chloride-vinyl acetate layers. If the layer to which the present coating composition is applied is a tough, wear resistant polyurethane layer, the surfactants may sometimes be eliminated. Examples of suitable surfactants are the low molecular weight water soluble polydimethyl siloxanes; the polysiloxane-polyoxyalkylene block copolymers as shown by U.S. Pats. Nos. 2,834,748, and 3,194,773; and the nonylphenoxy polyalkylene oxy alkanols and so forth. These surfactants are used in an amount of from about 0.2 to 1.5 parts by weight per 100 total parts by weight of the terpolymer and prepolymer.

THE METHOD OF USE

The coating composition of the present invention may be applied to the flexible substrate by roller coating, rotogravure printing, by a doctor blade, by spraying and so forth. The coated substrate can then be passed through an elongated hot air oven, over heating cans or passed through a hot air oven in the form of festoons at temperatures of from about 140 to 300° F. to remove the solvent and cure or react the terpolymer and prepolymer together. This treatment can be performed in one step or in a plurality of steps. For example, the coating composition can be dried at a lower temperature of about 140–200° F. to evaporate the solvent and avoid blistering and heated in another oven at about 220–280° F. to cure the polymers together. Any conventional apparatus can be employed for coating, solvent evaporation and recovery, curing and winding up the finally cured polymer coated layer or film. Instead of casting the coating composition on a substrate, it can be cast on a stainless steel belt or on a releasable paper or other material having a releasable surface such as one coated with a silicone resin or "Teflon" and after heating and curing the composition can be stripped from the belt as a self-supporting film.

The coating composition can be spread directly on the substrate. Alternatively, the composition can first be spread on the releasable backing, and after heating only to the extent that the coating is tacky, "kiss coated" to a fabric which is applied from above the coating so that "strike-through" is reduced or avoided. Then, the coating on the fabric is finally heated and cured to the fabric, and the resulting composite of coated fabric is stripped from the releasable backing. The composition of the present invention may also be applied to a scuff resistant polyurethane coating on a fabric backing as shown by the methods of French Pat. No. 1,424,061 "delivered" Nov. 29, 1965. Likewise, the releasable paper as discussed in said patent can be embossed to obtain decorative effects.

Substrates to which the coating of the present invention is applied include nonwoven (as in tire plies), felted, woven or knitted fabrics of natural and synthetic materials like cotton, glass, wool, linen, jute, silk, rayon, nylon, polyester, "Spandex," and polyacrylonitrile fibers and so forth and mixtures of the same to form adherent and flexible laminates. If desired, the fabric can first be primed with a plasticized vinyl chloride polymer or a rubbery copolymer of butadiene and acrylonitrile to prevent "strike-through." The coating composition of this invention can also be applied to solid or foamed flexible scuff-resistant polyether urethanes or polyester urethanes adhered to a fabric or substrate as disclosed above to provide an adherent top or slip coat on the scuff-resistant polyurethane coating attached to the laminate. Such composite laminates are flexible, scratch resistant and resistant to dry cleaning solvents. The coating composition of this invention can be applied as the top coating to a scuff-resistant polyurethane layer of a laminate comprising (1) a scuff resistant polyesterurethane layer, (2) a tie coat or layer of a thermoplastic polyurethane (reaction product of a polyester diol, MDI and butylene glycol deposited from a methyl ethyl ketone/tetrahydrofuran/dimethylformamide solvent mix) although in some cases this coating may be eliminated, (3) a blown or porous (with "Celogen" or sodium bi-carbonate, etc.) and fused polyvinyl chloride plastisol layer, and (4) a bottom layer of knit cotton or other fabric. Instead of using the plastisol vinyl composition, a calendered plasticized vinyl having a blowing agent or being a foam can be used. The composition of the present invention may also be applied directly as a top coating on a polyvinyl chloride or polyvinyl chloride-vinyl acetate layer, supported or not.

The films and laminates made by the process of the present invention are useful in making articles of clothing such as wind breakers, sports jackets, raincoats, wall coverings, upholstery coverings for furniture and automobiles, seat covers, protective coverings or tarpaulins, packaging materials, and so forth. The moisture vapor transmission rate (MVTR) of unsupported films of the composition coating of the present invention may vary from 800 to 2400 (gm. $H_2O$/100 sq. m./hr./3 mil). Compositions of this invention cast onto a scuff resistant polyesterurethane layer supported on a cotton knit fabric as discussed above have MVTR's in the neighborhood of 1500–1700, compared to less than 100 for conventional PVC or rubber coated fabrics.

The following examples will serve to illustrate the invention with more particularity to those skilled in the art.

EXAMPLE I

The following were mixed with a wooden tongue depressor in an 8 oz. coffee cup:

10 grams of a 3.74% NCO prepolymer made by reacting 2 equivalents hexamethylene diisocyanate with 1 equivalent of a 2150 molecular weight (average) polyester, dihydroxyl terminated, made by reacting a blend of an excess of 60 weight percent ethylene glycol and 40 weight percent butylene glycol with adipic acid,
30 grams of a terpolymer solution made by reacting a monomer charge ratio of 13 weight percent beta-hydroxy ethyl methacrylate, 34% methyl acrylate, 53% methyl methacrylate at a 25% monomer concentration in methyl isobutyl ketone. Inherent viscosity (0.3% in tetrahydrofuran) 0.58, total solids 21.6%, hydroxyl number 62.2 on the terpolymer. This terpolymer solution is the solution from this polymerization reaction, and
.02 gram of dibutyl tin dilaurate.

One portion of the resulting mixture was allowed to stand 15 minutes for the air bubbles incorporated during mixing to rise and break, and was then coated on a glass plate with a 0.037" spaced. The coating was allowed to stand 15 minutes at room temperature and was then cured 10 minutes at 158° F. and 10 minutes at 250° F. After the glass plate cooled it was placed in a water bath for about 15 minutes to release the film. The dry film was colorless and about .005" thick.

The film was tested and the following results were obtained:

100% modulus—383 p.s.i.
Tensile strength—1550 p.s.i.
Elongation—190%
Taber abrasion—.0001 gram weight loss (CS17 wheel, 500 gram weight, 1000 cycles)

Another portion of the resulting mixture was blended with a solvent, equal weights of the mixture and the solvent, the solvent contained 50 weight percent methyl ethyl ketone and 50% toluene, and coated with a #6 wire wound rod, made by R. D. Specialties, Webster, N.Y., on an elastomeric scuff resistant urethane laminate (4 oz./sq.yd embossed urethane skin on a flexible napped knit fabric made with a blend of nylon and rayon fibers). This was cured 5 minutes at 158° F. and 10 minutes at 250° F. After standing overnight, the coated laminate had a dry, soft hand with good slip and good resistance to fingernail scratching (no apparent visible marks left when fingernail is pressed on the surface of the film and drawn across it).

EXAMPLE II

The method of this example was similar to that of Example I, above, except that the ingredients were used in the following proportions:
The composition or mixture contained 10 grams of prepolymer of Example I,
40 grams of terpolymer solution, and
0.2 gram of dibutyl tin dilaurate.

The physical propertes on the film obtained using this mixture were:

100% modulus—460 p.s.i.
Tensile strength—1815 p.s.i.
Elongation—180%
Taber abrasion—0 weight loss (CS17, 500 grams, 1000 cycles)

The coated laminate prepared as in Example I, but using the mixture of this example, had a dry, soft hand with excellent slip and fair resistance to fingernail scratching (slight marking of film).

EXAMPLE III

The method of this example was similar to that of Example I, above, except that a different terpolymer was used and there was a change in proportions.
The mixture or composition was prepared from 10 grams of the prepolymer of Example I,
40 grams of a terpolymer solution made by reacting a monomer charge ratio of 10 weight percent beta-hydroxy ethyl methacrylate, 35% methyl acrylate, 55% methyl methacrylate at a 25% monomer concentration in methyl isobutyl ketone. Inherent viscosity (0.3% tetrahydrofuran) 0.56, total solids, 22.4%, and
0.02 gram of dibutyl tin dilaurate.

Physical properties of the film obtained with this composition were:

100% modulus—424 p.s.i.
Tensile strength—2180 p.s.i.
Elongation—200%
Taber abrasion—.0002 gram weight loss (CS17, 500 grams, 1000 cycles)

The coated laminate produced with this composition had a dry, soft hand with excellent slip and fair resistance to fingernail scratching.

EXAMPLE IV

The method of this example was similar to that of Example I, above, except that a different terpolymer was used and the proportions were changed.
The composition or mixture contained 10 grams of the prepolymer of Example I.
40 grams of a solution comprising a terpolymer made by reacting a monomer charge ratio of 9 weight percent hydroxy ethyl acrylate, 35% methyl acrylate, 56% methyl methacrylate at a 25% monomer concentration in methyl isobutyl ketone, inherent viscosity (0.3% tetrahydrofuran) 0.58, total solids 21.9%, and
0.02 gram of dibutyl tin dilaurate.

Physical properties of the film obtained from this composition were:

100% modulus—150 p.s.i.
Tensile strength—710 p.s.i.
Elongation—250%
Taber abrasion—.0004 gram weight gain (CS17, 500 grams, 1000 cycles)

The coated laminate prepared from the composition had a dry, soft hand with good slip and fair resistance to fingernail scratching.

EXAMPLE V

The method of this example was similar to that of Example I, above, except that the terpolymer and proportions were different.

The composition or mixture contained 10 grams of the prepolymer of Example I,
40 grams of a terpolymer solution prepared with the same charge ratio as in Example II, above, but reacted to 0.37 inherent viscosity (0.3% tetrahydrofuran), 25.5% total solids in solution, and
0.02 gram dibutyl tin dilaurate.

Physical properties of the film obtained from this composition were:

100% modulus—443 p.s.i.
Tensile strength—2250 p.s.i.
Elongation—200%
Taber abrasion—.0001 gram weight loss (CS17, 500 grams, 1000 cycles)

After aging the film for 48 hours at 158° F. and 100% relative humidity, the properties of the film were:

100% modulus—400 p.s.i.
Tensile strength—1230 p.s.i.
Elongation—170%

After aging of the film for 408 hours in a fadeometer, the film remained colorless with the following properties:

100% modulus—467 p.s.i.
Tensile strength—1900 p.s.i.
Elongation—190%

The coated laminate prepared from the composition had a dry, soft hand with good slip and fair resistance to fingernail scratching.

A sample of the coated laminate was subjected to an accelerated dry cleaning test. A 1000 ml. Erlenmeyer flask was half filled with a solution containing 92% perchloroethylene, 3% #828 dry cleaning soap solution (R. R. Street Co., Chicago, Ill.) and 5% water. This flask was then placed on a magnetic stirrer hotplate with a Teflon coated 1½" stirring bar in the flask. The solution was heated to 180° F. with stirring to maintain a shallow vortex. A swatch of the coated laminate was placed in the flask for one hour, maintaining the temperature and agitation. The sample was removed and dried for 30 minutes at 158° F. and left at ambient conditions overnight. There was no visible change in the laminate finish or hand and only a very slight surface tack.

EXAMPLE VI

The method of this example was similar to that of Example V, above, except as shown below. The composition or mixture contained:

10 grams of the prepolymer of Example I,
40 grams of solution of terpolymer which was made with the same charge ratio as Example I, reacted to 0.76 inherent viscosity (0.3% tetrahydrofuran) and 24.5% total solids, and
0.02 gram of dibutyl tin dilaurate.

Physical properties of the film obtained from this composition were:

|  | Original | 48 hr., 158° F., 100% relative humidity | 408 hr. Fadeometer |
|---|---|---|---|
| 100% modulus, p.s.i. | 517 | 397 | 500 |
| Tensile strength, p.s.i. | 1,450 | 1,240 | 1,800 |
| Elongation, percent | 180 | 180 | 190 |
| Taber abrasion | (¹) | | |

¹ .0001 gram weight loss (CS17, 500 grams, 1,000 cycles).

The solution used for coating the urethane laminate had a pot life of less than 4 hours, but without the catalyst, it would have a pot life of about 24 hours.

The coated laminate had a soft, dry hand with good slip and fair resistance to fingernail scratching. It developed only a very slight tack on the accelerated dry cleaning test (see Example V).

EXAMPLE VII

The method of this example was similar to that of Example I, above, except as shown below. The composition or mixture contained:

10 grams of prepolymer of Example I,
40 grams of terpolymer solution made by reacting a monomer charge ratio of 15% beta hydroxy ethyl methacrylate, 35% methyl acrylate, and 50% methyl methacrylate at a 25% monomer concentration in methyl isobutyl ketone. Inherent viscosity (0.3% tetrahydrofuran) 0.61, total solids of 21.3%,
7.5 grams of (50/50 weight blend) methyl ethyl ketone and toluene, and
0.02 gram of dibutyl tin dilaurate.

The physical properties of the film obtained from this composition were as follows:

100% modulus—400 p.s.i.
Tensile strength—710 p.s.i.
Elongation—140%
Taber abrasion—.0002 gram weight loss (CS17, 500 grams, 1000 cycles)

The coated laminate had a soft, dry hand with good slip and resistance to fingernail scratching. It developed only a very slight tack on the accelerated dry cleaning test (see Example V).

EXAMPLE VIII

The method of this example was similar to that of Example I, above, except for the changes noted below. The composition or mixture contained:

10 grams of the prepolymer of Example I,
40 grams of solution of terpolymer made by reacting a monomer charge ratio of 18 weight percent beta hydroxy ethyl acrylate, 32% methyl acrylate, 50% methyl methacrylate at a 25% monomer concentration in methyl isobutyl ketone; inherent viscosity (0.3% tetrahydrofuran) 0.68 and total solids of 22.6 weight percent,
10 grams of (50/50 weight blend) methyl ethyl ketone/toluene, and
.02 gram of dibutyl tin dilaurate.

Physical properties of the film obtained from this composition were:

100% modulus—230 p.s.i.
Tensile strength—625 p.s.i.
Elongation—190%
Taber abrasion—0 weight change (CS17, 500 grams, 1000 cycles)

The coated laminate had a soft, dry hand with good slip and fair resistance to fingernail scratching. It became slightly tacky on the accelerated dry cleaning test (see Example V, above).

EXAMPLE IX

The method of this example was similar to that of Example I, above, except as noted below. The proportions and materials shown for the composition or mixture were:

10 grams of the prepolymer of Example I, above,
70 grams of terpolymer solution made by reacting a monomer charge ratio of 18 weight percent beta hydroxy ethyl acrylate, 32% ethyl acrylate, 50% methyl methacrylate at a 25% monomer concentration in methyl isobutyl ketone (0.73 inherent viscosity (0.3% tetrahydrofuran), 21.6% total solids), and
.05 gram of dibutyl tin dilaurate.

Physical properties of the film obtained from the composition were:

100% modulus—256 p.s.i.
Tensile strength—580 p.s.i.
Elongation—180%
Taber abrasion—.0003 gram weight loss (CS17, 500 grams, 1000 cycles)

The coated laminate had a soft, dry hand with excellent slip but poor resistance to fingernail scratching (highly visible marking). There was no visible or tactile change after subjecting the sample to the accelerated dry cleaning test (see Example V, above).

This example shows that when the relative ratios of prepolymer and terpolymer are outside the ranges required herein, the required resistance to scratching is not obtained.

However, repeating the above procedures but using only 40 grams of the terpolymer solution (within the limits of the ranges of this invention) gave a composition which, when coated on the laminate, had fair resistance to fingernail stratching and which was still not affected by the accelerated dry cleaning test (Example V).

EXAMPLE X

The method of this example was similar to that of Example I, above, except as noted below. The composition or mixture comprised:

10 grams of a 4.70% NCO prepolymer made by reacting 2 equivalents of bis (2-isocyanatoethyl) 4-cyclohexene-1,2-dicarboxylate with one equivalent of a dihydroxyl terminated 1000 molecular weight (average) poly 1,4-butylene adipate,
40 grams of a solution of terpolymer made with the same charge ratio as shown in Example I, above, reacted to 0.471 (0.3% in tetrahydrofuran) inherent viscosity, 24.3% total solids, and 52.4 hydroxyl number,
10 grams of (50/50 weight percent blend) methyl ethyl ketone/toluene, and
0.01 gram of dibutyl tin dilaurate.

Physical properties of the film obtained from this composition were:

100% modulus—618 p.s.i.
Tensile strength—2855 p.s.i.
Elongation—200%
Taber abrasion—.0005 gram weight loss (CS17, 500 grams, 1000 cycles)

Additional compositions were prepared and tested according to the procedures of the foregoing examples. The results obtained as shown in the following table indicate that within the ratio of monomers specified herein, a combination of satisfactory resistance to scratching and dry cleaning solvents will be obtained.

TABLE I.—EFFECT OF TERPOLYMER COMPOSITION ON FINISH COAT PROPERTIES (HEA-MA-MMA TERPOLYMERS)

[0.9 part terpolymer per 1.0 part prepolymer]

| Monomer charge ratio for terpolymer: | | | | | | | |
|---|---|---|---|---|---|---|---|
| HEA | 20 | 18 | 18 | 15 | 12 | 9 | 6 |
| MA | 30 | 32 | 50 | 35 | 34 | 35 | 36 |
| MMA | 50 | 50 | 32 | 50 | 54 | 56 | 58 |
| Original physical properties: | | | | | | | |
| 100% modulus (p.s.i.) | 200 | 300 | 200 | 200 | 200 | 200 | 200 |
| Tensile strength (p.s.i.) | 400 | 400 | 300 | 300 | 500 | 500 | 1,400 |
| Elongation (percent) | 150 | 140 | 116 | 160 | 200 | 220 | 300 |
| Resistance to accelerated dry cleaning test (agitation 1 hr. at 280° F. in prechloroethylene soap solution) | (1) | (2) | (3) | (2) | (2) | (2) | (2) |
| Fingernail scratch resistance | (4) | (5) | (6) | (5) | (5) | (6) | (7) |

1 Slight tack.
2 No change.
3 Tacky.
4 Good.
5 Fair.
6 Very good.
7 Poor.
HEA=beta hydroxy ethyl acrylate.
MA=methyl acrylate.
MMA=methyl methacrylate; prepolymer—about 3,6% NCO containing polyesterurethane prepolymer of hexamethylene diisocyanate and polyester diol (average molecular weight of about 2,500) of excess of a mixture of 60% ethylene glycol and 40% 1,4-butylene glycol with adipic acid.

What is claimed is:

1. A composition exhibiting resistance to scratching and resistance to dry cleaning solvents and comprising the reaction product of
   (A) an isocyanate-containing polyesterurethane obtained by the reaction of ingredients consisting essentially of:
      (A-1) a polyesterdiol of a saturated aliphatic dicarboxylic acid having from 4 to 10 carbon atoms and a saturated aliphatic glycol having from 2 to 6 carbon atoms, said polyesterdiol having an average molecular weight of from about 1000 to 4000 and having a carboxyl number of not over about 1.5, and
      (A-2) an aliphatic diisocyanate having from 4 to 14 carbon atoms between isocyanato groups, the mol ratio of said diisocyanate to said polyester diol being from about 1.5:1 to 2:1, and
   (B) a hydroxy containing acrylate terpolymer of the joint polymerization of ingredient consisting essentially of:
      (B-1) from about 7.5 to 18 mol percent of a monomer having the formula

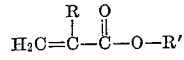

(B-2) from about 30 to 45 mol percent of a monomer having the formula

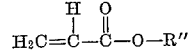

and
      (B-3) from about 40 to 55 mol percent of a monomer having the formula $$H_2C=\overset{R'''}{\underset{|}{C}}-\overset{O}{\underset{\|}{C}}-O-R''$$

where R is hydrogen or a methyl or an ethyl radical, where R' has the formula $$-\left[R_aO\right]_x\left[R_b\right]-OH$$

in which $R_a$ is an alkylene group of 2 to 3 carbon atoms, in which $R_b$ is an alkylene group of 2 to 4 carbon atoms and in which $x$ is 0 or 1, where R'' is an alkyl group of from 1 to 4 carbon atoms, and where R''' is a methyl or ethyl radical, the total of (B–1), (B–2) and (B–3) being equal to 100 mol percent, said terpolymer having an inherent viscosity (0.3% in tetrahydrofuran) of from about 0.3 to 0.75 and a hydroxyl number of from about 30 to 90, and where said (A) and (B) are used in an equivalence ratio of from about 1:1 to 1:1.5.

2. A composition according to claim 1 in which (A–1) has an average molecular weight of from about 2000 to 3000, in which (B–1) is used in an amount of from about 10 to 15 mol percent, in which (B) has an inherent viscosity of from about 0.4 to 0.5, and in which (B) has a hydroxyl number of from about 50 to 55.

3. A composition according to claim 2 in which (A–1) is a polyester obtained by the reaction of a mixture of ethylene glycol and 1,4-butylene glycol and adipic acid, in which (A–2) is hexamethylene diisocyanate, and in which (B) is a terpolymer of methyl methacrylate, methyl acrylate and beta hydroxy ethyl methacrylate.

4. A laminate comprising
 (1) a flexible substrate and
 (2) a relatively thin, adherent, flexible, scratch resistant and dry cleaning solvent resistant coating on said substrate and comprising the reaction product of
 (A) an isocyanate containing polyesterurethane obtained by the reaction of ingredients consisting essentially of:
  (A–1) a polyesterdiol of a saturated aliphatic dicarboxylic acid having from 4 to 10 carbon atoms and a saturated aliphatic glycol having from 2 to 6 carbon atoms, said polyester diol having an average molecular weight of from about 1000 to 4000 and having a carboxyl number of not over about 1.5, and
  (A–2) an aliphatic diisocyanate having from 4 to 14 carbon atoms between isocyanato groups, the mol ratio of said diisocyanate to said polyester diol being from about 1.5:1 to 2:1, and
 (B) a hydroxy containing acrylate terpolymer of the joint polymerization of ingredients consisting essentially of:
  (B–1) from about 7.5 to 18 mol percent of a monomer having the formula $$H_2C=\overset{R}{\underset{|}{C}}-\overset{O}{\underset{\|}{C}}-O-R'$$

(B–2) from about 30 to 45 mol percent of a monomer having the formula $$H_2C=\overset{H}{\underset{|}{C}}-\overset{O}{\underset{\|}{C}}-O-R''$$

and (B–3) from about 40 to 55 mol percent of a monomer having the formula $$H_2C=\overset{R'''}{\underset{|}{C}}-\overset{O}{\underset{\|}{C}}-O-R''$$

where R is hydrogen or a methyl or an ethyl radical, where R' has the formula $$-\left[R_aO\right]_x\left[R_b\right]-OH$$

in which $R_a$ is an alkylene group of 2 to 3 carbon atoms, in which $R_b$ is an alkylene group of 2 to 4 carbon atoms and in which $x$ is 0 or 1, where R'' is an alkyl group of from 1 to 4 carbon atoms, and where R''' is a methyl or ethyl radical, the total of (B–1), (B–2) and (B–3) being equal to 100 mol percent, said terpolymer having an inherent viscosity (0.3% in tetrahydrofuran) of from about 0.3 to 0.75 and a hydroxyl number of from about 30 to 90, and where said (A) and said (B) are used in an equivalence ratio of from about 1:1 to 1:1.5.

5. A laminate according to claim 4 in which (A–1) has an average molecular weight of from about 2000 to 3000, in which (B–1) is used in an amount of from about 10 to 15 mol percent, in which (B) has an inherent viscosity of from about 0.4 to 0.5, in which (B) has a hydroxyl number of from about 50 to 55, and in which (2) has a thickness of from about 0.1 to 0.4 mil.

6. A laminate according to claim 5 in which (A–1) is a polyester obtained by the reaction of a mixture of ethylene glycol and 1,4-butylene glycol and adipic acid, in which (A–2) is hexamethylene diisocyanate, and in which (B) is a terpolymer of methyl methacrylate, methyl acrylate and beta hydroxy ethyl methacrylate.

7. A laminate according to claim 4 in which said substrate comprises a fabric composed of fibers of a material selected from the group consisting of cotton, glass, wool, linen, jute, silk, nylon, polyester, polyurethane and polyacrylonitrile fibers and mixtures of the same.

8. A laminate according to claim 7 in which there is adheringly disposed between said (1) and said (2) a layer of a flexible scuff resistant polyesterurethane composition.

9. A laminate according to claim 7 in which there is adheringly disposed between said (1) and said (2), composite, adherent layers of (3) a resilient scuff resistant polyesterurethane composition and (4) a porous plasticized polyvinyl chloride composition, one surface each of said layers (3) and (4) being in adhering contact with each other, the opposite surface of said (3) being in adherent contact with said (2), and the opposite surface of said (4) being in adherent contact with said (1).

References Cited

UNITED STATES PATENTS

| | | | |
|---|---|---|---|
| 3,396,210 | 8/1968 | McKillip et al. | 260—859 |
| 3,304,273 | 2/1967 | Stamberger | 260—2.5 |
| 3,284,415 | 11/1966 | Horvath | 260—77.5 |
| 3,262,805 | 7/1966 | Aoki | 117—11 |
| 3,061,497 | 10/1962 | Wilson et al. | 156—30 |

ROBERT F. BURNETT, Primary Examiner

M. A. LITMAN, Assistant Examiner

U.S. Cl. X.R.

117—76; 161—190; 260—2.5, 77.5, 859